United States Patent
Leyden (10) Patent No.: US 9,996,710 B2
(45) Date of Patent: Jun. 12, 2018

(54) SECURITY SYSTEM FOR ELECTRONIC DEVICE

(71) Applicant: Se-Kure Controls, Inc., Franklin Park, IL (US)

(72) Inventor: Roger J. Leyden, Inverness, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 298 days.

(21) Appl. No.: 14/927,857

(22) Filed: Oct. 30, 2015

(65) Prior Publication Data

US 2017/0124357 A1     May 4, 2017

(51) Int. Cl.
| | |
|---|---|
| *G06F 1/16* | (2006.01) |
| *G06F 21/88* | (2013.01) |
| *E05B 73/00* | (2006.01) |
| *F16B 41/00* | (2006.01) |

(52) U.S. Cl.
CPC .......... *G06F 21/88* (2013.01); *E05B 73/0082* (2013.01); *F16B 41/00* (2013.01)

(58) Field of Classification Search
CPC .... G06F 1/1613; G06F 1/1616; G06F 1/1633; E05B 73/0082
See application file for complete search history.

(56) References Cited

U.S. PATENT DOCUMENTS

| | | | | |
|---|---|---|---|---|
| 5,836,183 A | * | 11/1998 | Derman | E05B 73/0082 248/553 |
| 6,216,499 B1 | * | 4/2001 | Ronberg | E05B 73/0082 248/551 |
| 7,007,912 B1 | * | 3/2006 | Giuliani | E05B 73/0082 248/552 |
| D559,076 S | * | 1/2008 | Allen | D8/330 |
| 7,370,840 B1 | * | 5/2008 | Deconinck | E05B 73/0082 248/316.1 |
| 8,061,164 B2 | * | 11/2011 | Johnston | E05B 73/0082 248/553 |
| 8,646,294 B1 | * | 2/2014 | Derman | E05B 73/0082 248/551 |
| 8,720,848 B2 | * | 5/2014 | Tan | E05B 73/0082 248/346.01 |

(Continued)

*Primary Examiner* — Anthony Q Edwards
(74) *Attorney, Agent, or Firm* — Wood, Phillips, Katz, Clark & Mortimer (57) ABSTRACT

The combination of an electronic device and a security system therefor. The electronic device has a first component with an upper surface and a second component configured to be moved relative to the first component around a first axis. The security system has a holding system with a first holding assembly and at least one track assembly configured to guide translational movement of the first holding assembly in a path relative to the electronic device in a display position relative to a support at a display location. The at least one track assembly is secured to the support. The first holding assembly is guided from a starting position into a holding position. The first holding assembly in the holding position has a portion that resides over the upper surface of the first component adjacent to the first axis with the electronic device in the display position so as to engage the upper surface to thereby limit upward movement of the first component relative to the support.

21 Claims, 6 Drawing Sheets

(56) References Cited

U.S. PATENT DOCUMENTS

| | | | | |
|---|---|---|---|---|
| 8,783,073 B1* | 7/2014 | Derman | ............. | E05B 73/0005 |
| | | | | 248/551 |
| 2007/0290115 A1* | 12/2007 | Meyer | ................ | E05B 73/0082 |
| | | | | 248/346.06 |

* cited by examiner

SECURITY SYSTEM FOR ELECTRONIC DEVICE

BACKGROUND OF THE INVENTION

Field of the Invention

This invention relates to electronic devices and, more particularly, to a security system that allows inspection and operation of an electronic device at a display location while preventing unauthorized removal of the electronic device from the display location.

Background Art

As the number of different electronic devices, such as laptop computers, continues to escalate, it becomes increasingly important for businesses displaying the same to potential consumers to make the electronic devices readily available for inspection and operation. While laptop technology has evolved to the point that sophisticated devices are available at more affordable prices, the cost of laptops and other similar type electronic devices remains significant. Undeterred theft can significantly impact a business' bottom line.

Designers of security systems for electronic devices, such as laptop computers, have a number of primary design objectives. First of all, the security systems must reliably protect the devices against theft. The security systems must also be affordable such that the investment therein is justified by the anticipated losses that will be prevented.

It is also critical that the security systems be "user friendly". This involves several different aspects. First of all, the security systems must be flexible in that they must be capable of adapting to different point-of-purchase display sizes and configurations that exist, or may come into being, in businesses offering electronic devices for sale.

The security systems must also be of a nature that they can be readily and consistently set up by employees. Complicated security systems may be improperly set up by employees, which may make them ineffective. At a certain complexity level, employees may be tempted to avoid setting up security systems as a shortcut.

Finally, the security systems should not significantly interfere with the displayed devices so that their unencumbered appearance can be discerned by a would-be purchaser. Further, potential purchasers want to be able to conveniently use the electronic devices before committing to buy, particularly given the now vast number of options in terms of manufacturers and capabilities.

The industry continues to seek out better alternative ways to strive towards optimal balance of the above design objectives.

SUMMARY OF THE INVENTION

In one form, the invention is directed to the combination of an electronic device and a security system for the electronic device. The electronic device has a first component having an upper surface and a second component. The second component is one of: i) fixed relative to the first component; and ii) configured to be moved relative to the first component around a first axis between first and second positions. The security system includes a holding system having a first holding assembly. At least one track assembly is configured to guide translational movement of the first holding assembly in a path relative to the electronic device with the electronic device in a display position relative to a support at a display location. The at least one track assembly is configured to be secured to the support. The first holding assembly is configured to be guided by the at least one track assembly in movement along the path relative to the electronic device in the display position from a starting position into a holding position. The first holding assembly in the holding position has a portion that resides over the upper surface of the first component adjacent to the first axis with the electronic device in the display position so as to engage the upper surface to thereby limit upward movement of the first component relative to the support.

In one form, with the first holding assembly in the starting position, the portion of the first holding assembly does not reside over the upper surface of the first component with the electronic device in the display position.

In one form, the holding system has a second holding assembly that is one of: a) fixed relative to the at least one track assembly; and b) configured to be guided by the at least one track assembly in movement along a path relative to: i) the electronic device in the display position; and ii) the first holding assembly, from a starting position into a holding position. The second holding assembly has a portion that resides over the upper surface of the first component adjacent to the first axis with the electronic device in the display position so as to engage the upper surface to thereby limit upward movement of the first component relative to the support, with the second holding assembly either fixed relative to the at least one track assembly or moved relative to the at least one track assembly in its path into its holding position.

In one form, the first holding assembly has facing first and second surfaces between which a part of the electronic device resides with the first holding assembly in the holding position and the electronic device in the display position.

In one form, the first holding assembly has a main body with first and second cantilevered fingers respectively defining the first and second facing surfaces.

In one form, the first and second holding assemblies each have facing surfaces between which a part of the electronic device in the display position resides.

In one form, the second component has a peripheral edge and a peripheral edge surface portion that faces a plane containing the upper surface of the first component with the second component movable relative to the first component and in one of the first and second positions. A part of the first holding assembly resides between the peripheral edge surface portion and the plane containing the upper surface of the first component with the first holding assembly in the holding position and the second component in the one of the first and second positions.

In one form, the at least one track assembly has a single extruded component configured to guide movement of the first and second holding assemblies in their respective paths.

In one form, the at least one track assembly has a guide channel and at least one flange. The first holding assembly has a slide assembly that moves guidingly in the guide channel. The first holding assembly is further configured so that the one flange resides captively between a first pair of facing surfaces on the first holding assembly.

In one form, the first holding assembly has a main body, a slider component and a securing component. The slider component resides between the main body and securing component. The facing surfaces are defined one each on the main body and the securing component.

In one form, the main body defines a second pair of facing surfaces between which a part of the electronic device resides with the first holding assembly in the holding position relative to the electronic device in the display position.

In one form, the main body has a pair of cantilevered fingers that are in spaced relationship with each other. One of the facing surfaces on the second pair of facing surfaces is defined on each of the first and second fingers.

In one form, the first holding assembly has a fastener that is turned around an axis to secure the main body, slider component, and securing component together as a unit.

In one form, the first holding assembly has a keying element that is configured to interact between at least two of the main body, a slider component, and securing component at a location spaced from the fastener axis to resist relative turning of the at least two of the main body, slider component, and securing component around the fastener axis.

In one form, the electronic device is a portable computer and the second component is a monitor.

In one form, the main body has a single piece that defines the first and second cantilevered fingers and a stem. The first holding assembly further includes a slider component that cooperates with the at least one track assembly to guide the first holding assembly along the path. The stem of the body is connected to the slider component so that the stem projects in cantilever fashion from the slider component.

In one form, the main body has an overall shape of the letter "F".

In one form, the first holding assembly has a body defining a U-shaped opening bounded by a pair of facing surfaces between which a part of the electronic device resides with the first holding assembly in the holding position relative to the electronic device in the display position. The holding system further includes a second holding assembly that is a mirror image of the first holding assembly and configured to cooperate with the electronic device in the same way the first holding assembly cooperates with the electronic device.

In one form, the second holding assembly has a main body that is interchangeable with the main body on the first holding assembly.

In one form, the holding system has a second holding assembly. The first and second holding assemblies each have a body defining a U-shaped opening bounded by facing surfaces between which a part of the electronic device resides with the first and second holding assemblies in holding positions relative to the electronic device in the display position. The U-shaped openings open towards each other.

In one form, the invention is directed to a security system as described above.

DETAILED DESCRIPTION OF THE PREFERRED EMBODIMENT

Figure 1:
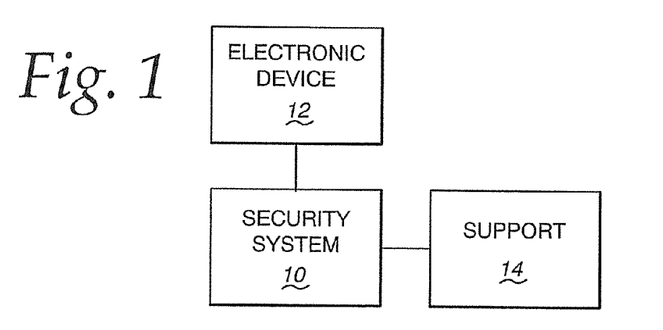
FIG. 1 is a schematic representation of a security system, according to the present invention, for securing an electronic device relative to a support.

The invention is directed to a security system as shown schematically at 10 in FIG. 1. The security system 10 is designed specifically for use with an electronic device 12, that may take virtually an unlimited number of different configurations. The electronic device 12 may be reconfigurable or have a fixed configuration. The security system 10 is connected to a support 14, such as those typically provided at a point-of-purchase location.

Figure 2:
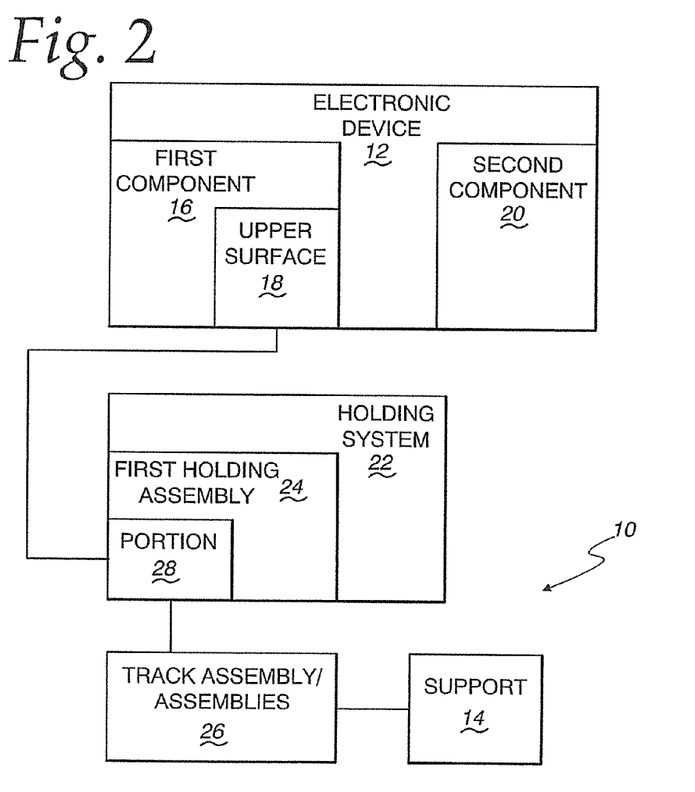
FIG. 2 is a schematic representation showing additional details of each of the components in FIG. 1.

A more specific schematic showing of the security system 10 is provided in FIG. 2 in relation to one exemplary electronic device having relatively movable components, such as commonly found on a laptop computer, notebook computer, etc.

As shown in FIG. 2, the electronic device 12 has a first component 16 with an upper surface 18. A second component 20 is configured to be moved relative to the first component 16 around an axis between first and second positions.

The security system 10 has a holding system 22 with at least a first holding assembly 24.

The security system 10 further includes at least one track assembly 26 configured to guide translational movement of the first holding assembly 24 in a path relative to the electronic device 12 with the electronic device in a display position relative to the support 14, as at a display location. The track assembly 26 is secured to the support 14. The first holding assembly 24 is configured to be guided by the track assembly 26 in movement along the path relative to the electronic device 12 from a starting position into a holding position.

The first holding assembly 24 in its holding position has a portion 28 that resides over the upper surface 18 of the first component 16 adjacent to the aforementioned axis about which the first and second components 16, 20 are relatively movable, so as to engage the upper surface 18 to thereby limit upward movement of the first component 16 relative to the support 14.

The schematic showing in FIGS. 1 and 2 is intended to encompass the specific embodiments described hereinbelow, as well as variations thereof, including virtually an unlimited number of variations of the individual components and their interactions. The schematic showing is intended to encompass all such variations.

Also, the schematic showing of the electronic device 12 is intended to encompass different electronic devices, with the exemplary laptop computer configuration described hereinbelow used only as a representative device.

It should also be noted that the orientations "upper", etc. are utilized arbitrarily only to define a frame of reference. It is conceivable that the electronic devices can be secured in display positions wherein they have different orientations. The specific characterization of the orientation throughout is not intended to be limiting.

Specific embodiments of the invention will now be described in greater detail in FIGS. 3-11.

Figure 3:
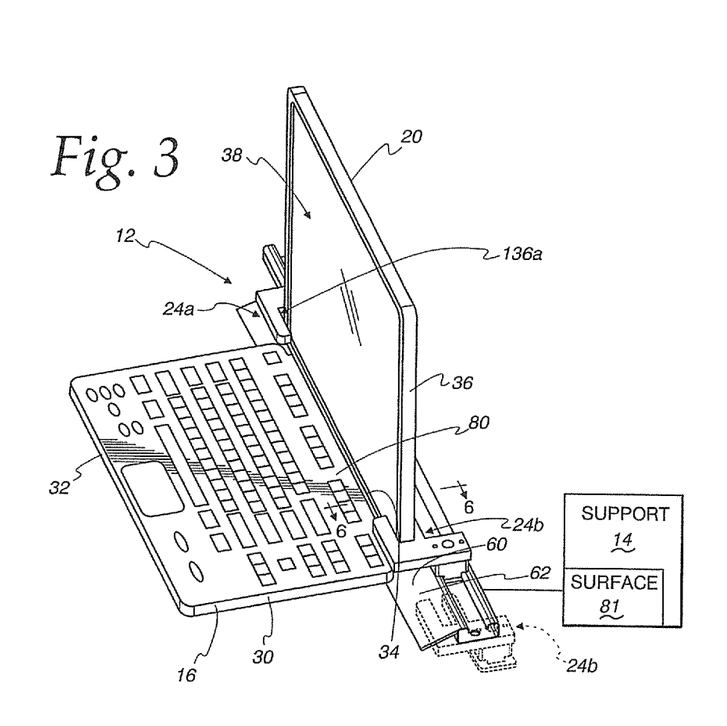
FIG. 3 is a perspective view of an exemplary electronic device, of a type shown in FIGS. 1 and 2, with one specific form of security system, as shown in FIGS. 1 and 2, securing the electronic device relative to the support.
Figure 4:
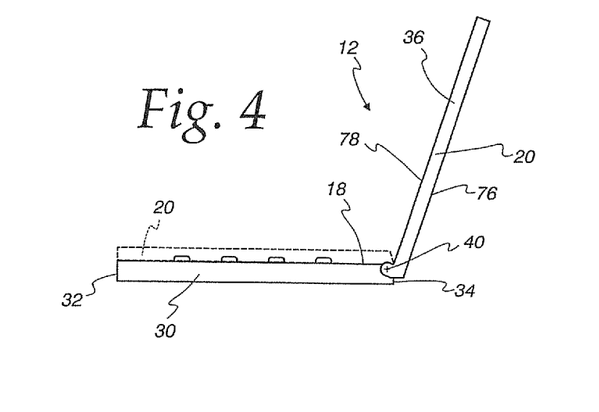
FIG. 4 is a side elevation view of the electronic device in FIG. 3 and showing movable components thereon in two different relationships.

In FIGS. 3 and 4, the exemplary electronic device 12 is shown with a configuration typical of laptop computers although, as noted, the invention is not limited to this specific configuration, type of computer, or to a computer at all. The first component 16 is made with a case 30 housing and supporting the primary computer components, such as drives, a keyboard, etc. The case 30 has a front 32 and a rear 34.

The second component 20 also has a case 36 and defines a monitor/display at 38.

The second component 20 is configured to be moved relative to the first component 16 around the aforementioned axis 40 between a first operative position, as shown in solid lines in FIGS. 3 and 4, and a second, stored position, as shown in dotted lines in FIG. 4.

The invention also contemplates use with an electronic device that has a fixed configuration corresponding generally to the shape of the depicted laptop in its operative position.

The axis 40 is a substantially horizontal axis with the first component 16 supported upon an upwardly facing surface. The axis 40 is adjacent to the rear of the first component 16.

The holding system 22 consists of the first holding assembly 24. While a single holding assembly 24 could be utilized in conjunction with some other structure (not shown) for each electronic device 12, in a preferred form, the holding system 22 is made up of multiple holding assemblies that work cooperatively in pairs, identified as 24a, 24b, for each electronic device.

The holding system 22 cooperates with at least one of the aforementioned track assemblies 26. Each track assembly 26 is shown as a single, extruded body 42. The bodies 42 might be combined to produce an overall combined length that is desired for a particular display. The lengths may be selected to accommodate a single electronic device, or a desired multiple of the electronic devices 12. Alternatively, a single length might span a full, usable dimension at the display location.

Figure 5:
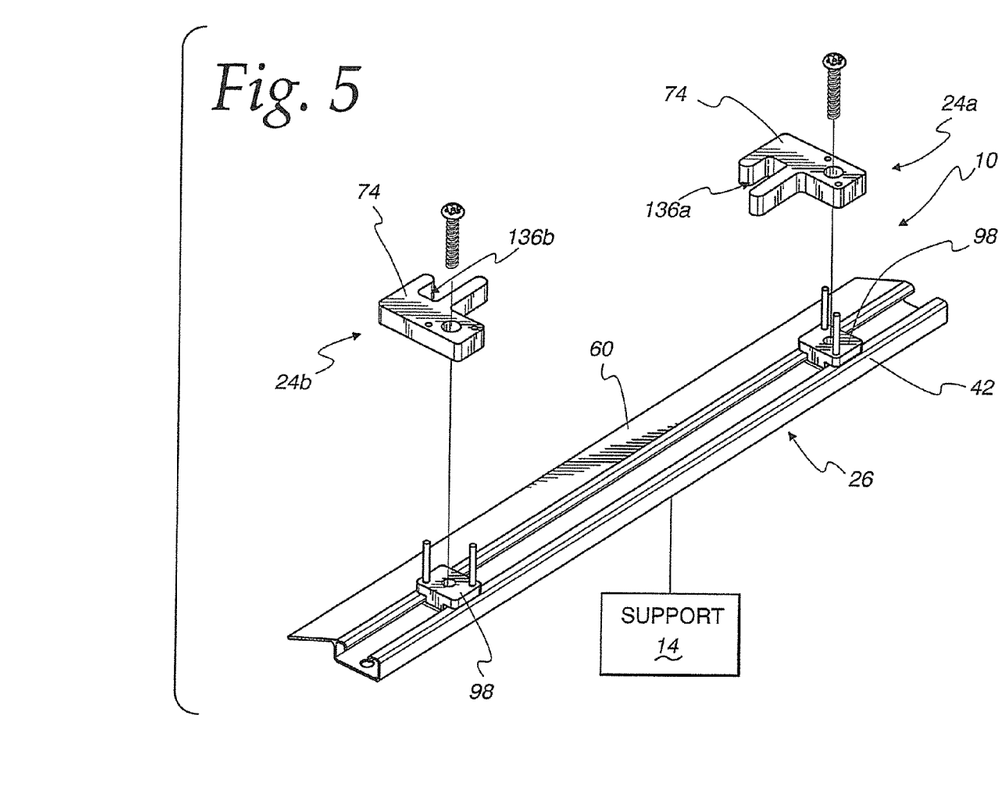
FIG. 5 is an enlarged, exploded, perspective view of the security system shown in FIG. 3.
Figure 6:
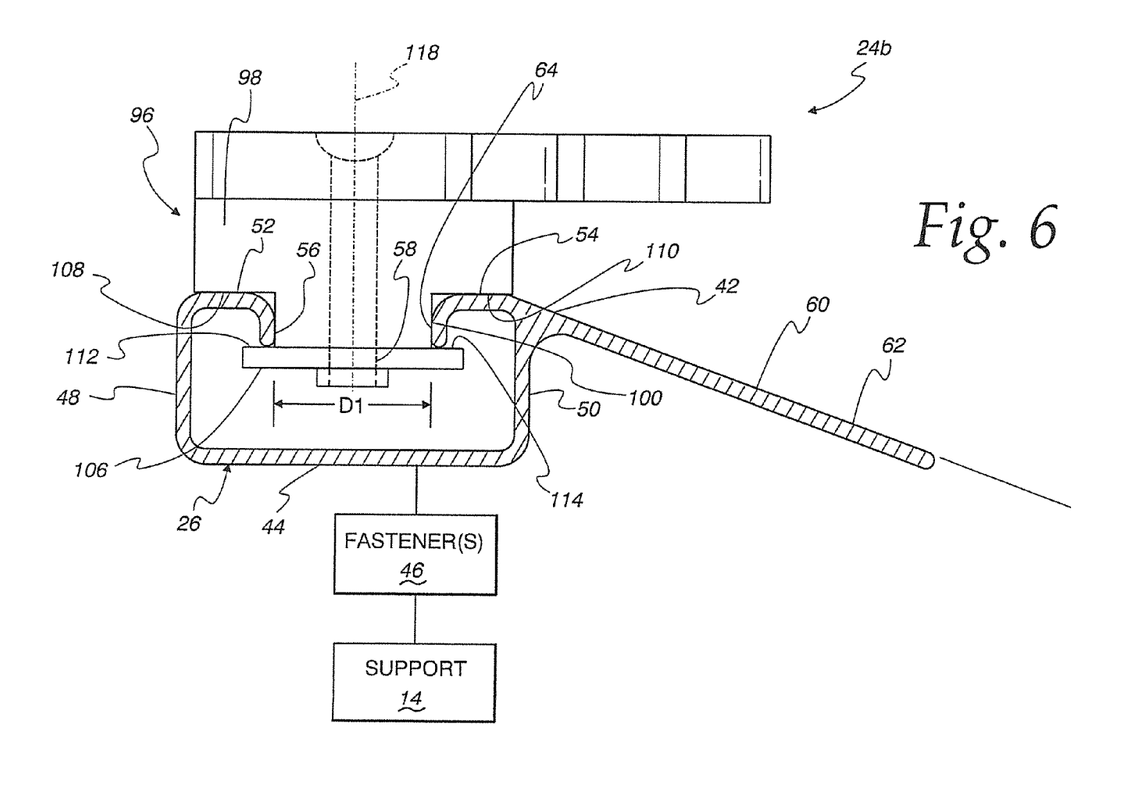
FIG. 6 is an enlarged, cross-sectional view of the security system taken along the line 6-6 of FIG. 3.

The body 42 consists of a base wall portion 44 that is secured to the support 14 through one or more suitable fasteners 46. The base wall portion blends into spaced side wall portions 48, 50, which in turn respectively blend into flanges 52, 54 that project towards each other and in turn terminate in depending wall portions 56, 58, respectively. The side wall portion 50 blends also into a front pad 60 with an enlarged, upwardly facing surface 62 that is angled to horizontal and supports the electronic device 12 in its display position at the display location whereat the support 14 is located.

Between the depending wall portions 56, 58, a guide channel 64 is defined for each of the holding assemblies 24a, 24b. The holding assemblies 24a, 24b are guided in translational movement in predetermined paths relative to the track assembly 26. The depicted paths are straight, but could be non-straight with a configuration that still allows the holding assemblies 24a, 24b to be moved guidingly therealong in a predetermined manner.

Each of the holding assemblies 24a, 24b has a starting position and a holding position in relationship to each other and the displayed electronic device 12. In their holding positions, the holding assemblies 24a, 24b interact directly with the electronic device 12.

In FIG. 3, the holding assembly 24a is shown in its holding position with the holding assembly 24b shown in its starting position in dotted lines. With the electronic device 12 therebetween, one or both of the holding assemblies 24a, 24b can be moved to reduce the spacing therebetween and to place each of them in their respective holding position, as shown for the holding assembly 24b in solid lines in FIG. 3.

The holding assembly 24b has facing surfaces 66, 68 defined by cantilevered fingers 70, 72 on an associated main body 74. With the holding assembly 24b in its holding position, the finger 70 and its associated surface 66 reside on one side 76 of the second component 20, with the finger 72 and its associated surface 68 residing on the other side 78 of the second component 20. At the same time, another finger surface 80, corresponding to the aforementioned portion 28 on the first holding assembly 24, resides over the upper surface 80 on the first component 16 adjacent to the axis 40. This overlying relationship is such that the surface 80 will engage the upper surface 18 to thereby limit upward movement of the first component 16 relative to the support 14. Thus, the first component 16 becomes captive between the surface 80 and the surface 62 on the pad 60 and/or supporting surface 81 on the support 14.

The holding assembly 24a may be moved from its corresponding starting position into a similar holding position at the other lateral side of the electronic device 12. The interaction of each of the holding assemblies 24a, 24b with the electronic device 12 is the same, though this is not a requirement.

The surfaces 66, 68 are spaced to confine fore-and-aft movement of the electronic device 12 in its display position. The spacing may be adequate to allow the second component 20 to pivot freely between its first and second positions without interference.

Alternatively, one of the holding assemblies 24a, 24b may be fixed in relationship to the track assembly 26 in what becomes its holding position. The electronic device 12 can then be repositioned relative to the fixed one of the holding assemblies 24a, 24b after which the other of the holding assemblies 24a, 24b can be moved from its starting position into its holding position to effect securement of the electronic device 12.

Accordingly, the electronic device 12 becomes captive between the holding assemblies 24a, 24b in a lateral direction and captive in a fore-and-aft direction between the surfaces 66, 68, and corresponding surfaces on the holding assembly 24a.

Figures 9, 10, 11:
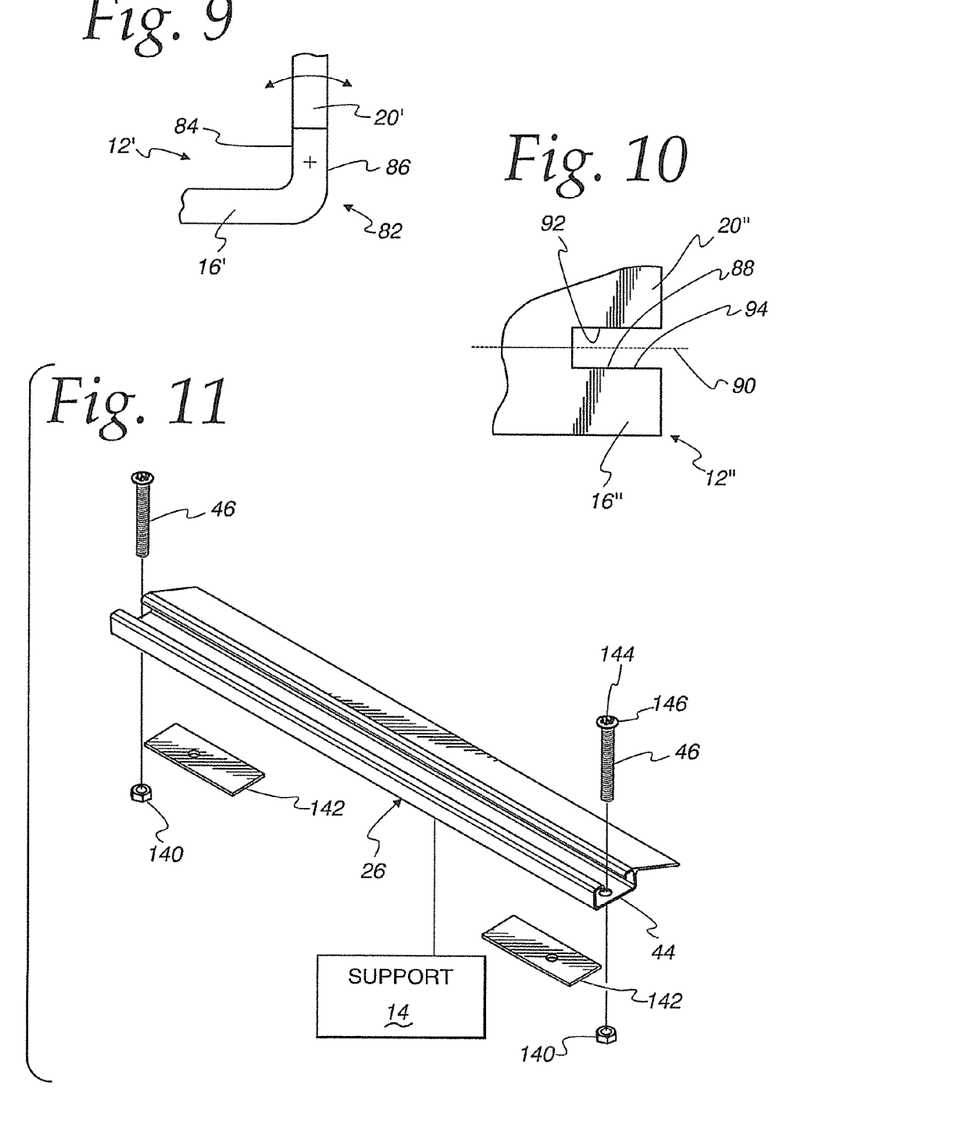
FIG. 9 is a fragmentary, side elevation view of a modified form of electronic device with which the inventive security system can be utilized.
FIG. 10 is a fragmentary, front, elevation view of a part of another form of electronic device with which the inventive security system can be utilized.
FIG. 11 is an exploded perspective view of the track assembly on the inventive security system in FIGS. 3 and 5-8 with fasteners used to secure the same to the support.

While the first and second components 16, 20 on the electronic device 12 have a construction wherein the first component 16 does not extend above the surface 80, other electronic device designs have different types of hinge configurations, such as that shown at 82 on the device 12' in FIG. 9. In this embodiment, the surfaces 66, 68 would extend on opposite sides 84, 86 of an upstanding hinge arrangement defined by one of the components 16', 20' separately, or cooperatively thereby. The surfaces 66, 68 in this design straddle a part of one or both of the first and second components 16', 20'.

In a further modified form of electronic device as shown at 12" in FIG. 10, gaps 88 are provided between the first and second components 16", 20", which turn relative to each other around an axis 90 corresponding to the aforementioned axis 40. In this arrangement, the exemplary holding assembly 24b would move into one of the gaps 88 whereupon the body 74 situates directly under a surface portion 92 on the second component 20" to reside captive therebetween and a facing surface 94 on the first component 16", corresponding to the surface 80 on the electronic device 12. As depicted, the portion 92 makes up part of a peripheral edge of the second component 20". It is possible that a direct captive arrangement may not be produced. Instead, the portion 92 might face a plane containing the surface 94 on the first component 16".

In FIGS. 5-8, further details of the exemplary holding assembly 24*b* are shown. The holding assembly 24*b* consists of a slide assembly 96 that moves guidingly in the channel 64. The slide assembly 96 consists of a slider component/body 98 in the form of a generally squared block with a narrow rail 100 bounded by parallel surfaces 102, 104. The surfaces 102, 104 are spaced from each other a distance D that is slightly less than the distance D1 between the depending wall portions 56, 58 on the flanges 52, 54. The wall portions 56, 58 guide the rail 100 in a predetermined path.

Figure 7:
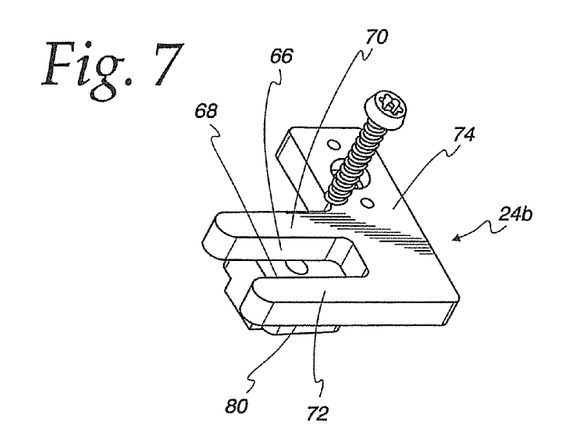
FIG. 7 is an enlarged, exploded, perspective view of a holding assembly that cooperates with a track assembly on the inventive security system in FIGS. 3-6.
Figure 8:
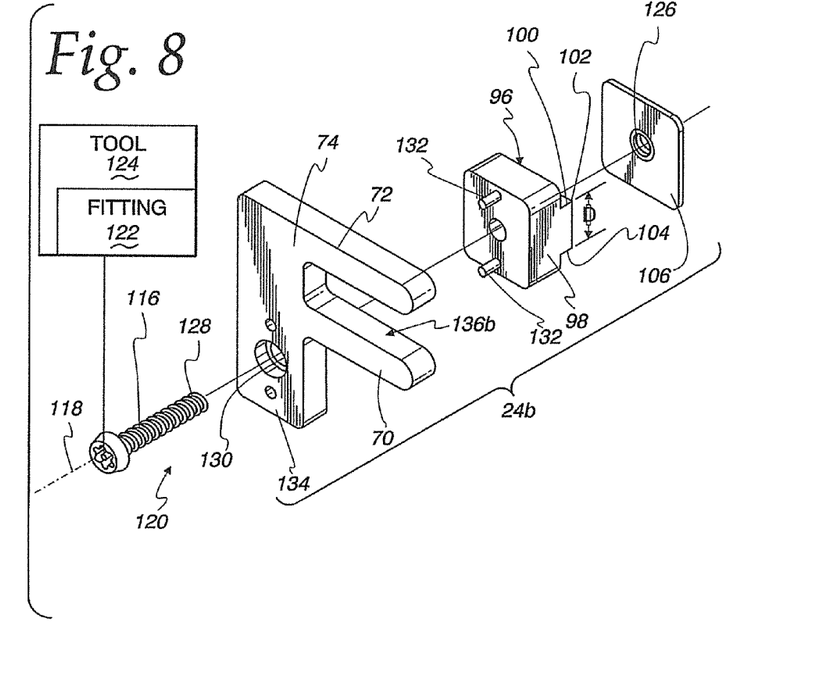
FIG. 8 is an enlarged, exploded, perspective view of the holding assembly in FIG. 7.

In this embodiment, the slide assembly consists of a single slider component/body 98. Multiple components may be utilized. The holding assembly 24*b* consists of this slider component body 98 together with the main body 74 and a securing component 106.

With the holding assembly 24*b* assembled on the track assembly 26, the flanges 52, 54 are captive between surfaces 108, 110 on the slide component/body 98 and facing surfaces 112, 114 on the securing component 106.

The holding assembly 24*b* further includes a fastener 116 that is turned around an axis 118 to secure the main body 74, slider component/body 98, and securing component 106 together as a unit. In this embodiment, the fastener 116 is a threaded fastener with an enlarged head 120 through which the fastener 116 can be turned. In this embodiment, the head 120 has a configuration to be engaged by a customized fitting 122 on a tool 124 so that the fastener 116 cannot be turned by conventional tools, thereby reducing the likelihood of tampering by a would-be thief.

At least the securing component 106 has a threaded bore 126 to engage threads 128 on the fastener 116. The main body 74 and slider component/body 98 may be threaded or one or both may have an unthreaded bore to accommodate the fastener 116. Tightening of the fastener 116 draws the main body 74, slider component/body 98, and securing component 106 against each other. In this embodiment, the main body 74 has a recess 130 to accommodate the head 120 on the tightened fastener 116.

At least one, and in this embodiment two, keying elements 132 interact between at least two of the main body 74, slider component/body 98, and securing component 106 at locations spaced from the axis 118 to resist relative turning of the at least two components around the fastener axis 118.

It should be understood that the holding assemblies 24*a*, 24*b* can take forms different than that depicted. In the depicted form, the main body 74 has a single piece that defines the cantilevered fingers 70, 72 and a transverse elongate stem 134 from which the fingers 70, 72 project in cantilevered fashion. The slider component/body 98 is connected to the main body 74 so that the elongate stem 134 projects in cantilever fashion from the slider component/body 98.

As depicted, the main body 74 has an overall shape of the letter "F".

With the described configuration, the holding assemblies 24*a*, 24*b* respectively define U-shaped openings 136*a*, 136*b* between the fingers 70, 72 and like fingers on the holding assembly 24*a*. The U-shaped openings 136*a*, 136*b* open towards each other.

As depicted, the holding assemblies 24*a*, 24*b* are mirror images of each other. The holding assemblies 24*a*, 24*b* can be made with identical components and reversed on the track assembly to perform as described above. Since the parts of the holding assemblies 24*a*, 24*b* are interchangeable, manufacture and inventory of parts is facilitated.

The track assembly 26 can be made in multiple different sizes that can be used together in different combinations or individually. For example, the track assemblies 26 may be made in different lengths such as 18 inches, 36 inches, 72 inches, etc.

As shown in FIG. 11, the track assembly 26 can be secured to the support 14 using the aforementioned fasteners 46 directed through the base 44 into the support 14. The fasteners 46 may be in the form of bolts secured as by nuts 140. A double-sided foam tape 142 can be applied between the base 44 and support 14 to stabilize the fixation of the track assembly 26 relative to the support 14. The fasteners 46 may each incorporate a special fitting 144 into a head 146 thereon.

With the above described structure, the electronic device 12 is captively held cooperatively by the holding assemblies 24*a*, 24*b* and track assembly 26 and is precluded from being reconfigured and/or repositioned to be freed therefrom. The inventive structure may be configured so that the second component 20, in a movable form, might be allowed to pivot relative to the first component 16, as to allow a user to change the viewing perspective of a monitor on the second component 20. Alternatively, the holding assemblies 24*a*, 24*b* may effectively fix the position of the second component 20 or allow only a limited movement thereof.

The foregoing disclosure of specific embodiments is intended to be illustrative of the broad concepts comprehended by the invention.

The invention claimed is:

1. In combination:
    a) an electronic device comprising:
        a first component having an upper surface; and
        a second component,
        the second component is one of: i) fixed relative to the first component and projects away from the first component at a first location; and ii) configured to be moved relative to the first component around a first axis between first and second positions; and
    b) a security system for the electronic device, the security system comprising:
        a holding system comprising a first holding assembly; and
        at least one track assembly configured to guide translational movement of the first holding assembly in a path relative to the electronic device with the electronic device in a display position relative to a support at a display location,
        the at least one track assembly configured to be secured to the support,
        the first holding assembly having a part configured to be moved as one piece and guided by the at least one track assembly in movement along the path relative to the electronic device in the display position from a starting position into a holding position,
        the first holding assembly having a portion that is configured to move with the part of the first holding assembly along the path relative to the electronic device in the display position and over the upper surface of the first component adjacent to either: i) the first location in the event the second component is fixed relative to the first component; or ii) the first axis in the event the second component is configured to be moved relative to the first component so as to engage the upper surface to thereby limit upward movement of the first component relative to the support.

2. The combination according to claim 1 wherein with the first holding assembly in the starting position, the portion of the first holding assembly does not reside over the upper surface of the first component with the electronic device in the display position.

3. The combination according to claim 1 wherein the holding system comprises a second holding assembly that is one of: a) fixed relative to the at least one track assembly; and b) configured to be guided by the at least one track assembly in movement along a path relative to: i) the electronic device in the display position; and ii) the first holding assembly from a starting position into a holding position, the second holding assembly having a portion that resides over the upper surface of the first component with the electronic device in the display position so as to engage the upper surface to thereby limit upward movement of the first component relative to the support with the second holding assembly either fixed relative to the at least one track assembly or moved relative to the at least one track assembly in its path into its holding position.

4. The combination according to claim 1 wherein the first holding assembly comprises facing first and second surfaces between which a part of the electronic device resides with the first holding assembly in the holding position and the electronic device in the display position.

5. The combination according to claim 4 wherein the first holding assembly comprises a main body with first and second cantilevered fingers respectively defining the first and second facing surfaces.

6. The combination according to claim 3 wherein the first and second holding assemblies each comprises facing surfaces between which a part of the electronic device in the display position resides.

7. The combination according to claim 1 wherein the second component has a peripheral edge and a peripheral edge surface portion that faces a plane containing the upper surface of the first component with the second component movable relative to the first component and in one of the first and second positions, and a part of the first holding assembly resides between the peripheral edge surface portion and the plane containing the upper surface of the first component with the first holding assembly in the holding position and the second component in the one of the first and second positions.

8. The combination according to claim 3 wherein the at least one track assembly comprises a single extruded component configured to guide movement of the first and second holding assemblies in their respective paths.

9. The combination according to claim 1 wherein the at least one track assembly comprises a guide channel and at least one flange and the first holding assembly comprises a slide assembly that moves guidingly in the guide channel and the first holding assembly is further configured so that the one flange resides captively between a first pair of facing surfaces on the first holding assembly.

10. The combination according to claim 9 wherein the first holding assembly comprises a main body, a slider component and a securing component, the slider component residing between the main body and securing component and the facing surfaces are defined one each on the main body and the securing component.

11. The combination according to claim 10 wherein the main body defines a second pair of facing surfaces between which a part of the electronic device resides with the first holding assembly in the holding position relative to the electronic device in the display position.

12. The combination according to claim 11 wherein the main body comprises a pair of cantilevered fingers that are in spaced relationship with each other and one of the facing surfaces on the second pair of facing surfaces is defined on each of the first and second fingers.

13. The combination according to claim 10 wherein the first holding assembly comprises a fastener that is turned around an axis to secure the main body, slider component, and securing component together as a unit.

14. The combination according to claim 13 wherein the first holding assembly comprises a keying element that is configured to interact between at least two of the main body, a slider component, and securing component at a location spaced from the fastener axis to resist relative turning of the at least two of the main body, slider component, and securing component around the fastener axis.

15. The combination according to claim 1 wherein the electronic device is a portable computer and the second component comprises a monitor.

16. The combination according to claim 4 wherein the first holding assembly comprises a main body with a single piece that defines the first and second cantilevered fingers and a stem, the first holding assembly further comprising a slider component that cooperates with the at least one track assembly to guide the first holding assembly along the path and the stem of the body is connected to the slider component so that the stem projects in cantilever fashion from the slider component.

17. The combination according to claim 16 wherein the main body has an overall shape of the letter "F".

18. The combination according to claim 1 wherein the first holding assembly comprises a body defining a U-shaped opening bounded by a pair of facing surfaces between which a part of the electronic device resides with the first holding assembly in the holding position relative to the electronic device in the display position and the holding system further comprises a second holding assembly that is a mirror image of the first holding assembly and configured to cooperate with the electronic device in the same way the first holding assembly cooperates with the electronic device.

19. The combination according to claim 18 wherein the second holding assembly has a main body that is interchangeable with the main body on the first holding assembly.

20. The combination according to claim 1 wherein the holding system comprises a second holding assembly, the first and second holding assemblies each comprising a body defining a U-shaped opening bounded by facing surfaces
between which a part of the electronic device resides with the first and second holding assemblies in holding positions relative to the electronic device in the display position, the U-shaped openings opening towards each other.

21. A security system as recited in claim 1.

* * * * *